(12) United States Patent
Ishizuka et al.

(10) Patent No.: US 9,382,430 B2
(45) Date of Patent: Jul. 5, 2016

(54) THERMOSETTING POWDER COATING MATERIAL AND COATED PRODUCT

(71) Applicant: FUJI XEROX CO., LTD., Tokyo (JP)

(72) Inventors: Takahiro Ishizuka, Kanagawa (JP); Yasuo Matsumura, Kanagawa (JP); Satoshi Yoshida, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/598,643

(22) Filed: Jan. 16, 2015

(65) Prior Publication Data

US 2016/0075885 A1   Mar. 17, 2016

(30) Foreign Application Priority Data

Sep. 12, 2014   (JP) ................. 2014-186415

(51) Int. Cl.
| | |
|---|---|
| *C08G 63/682* | (2006.01) |
| *C09D 5/03* | (2006.01) |
| *C09D 125/14* | (2006.01) |
| *C09D 167/02* | (2006.01) |

(52) U.S. Cl.
CPC .............. *C09D 5/031* (2013.01); *C09D 125/14* (2013.01); *C09D 167/02* (2013.01)

(58) Field of Classification Search
CPC ............................... C08L 63/00; C09D 127/06
USPC ........................ 523/437; 427/180, 386, 407.1
See application file for complete search history.

(56) References Cited

U.S. PATENT DOCUMENTS

| | | |
|---|---|---|
| 6,359,067 B1 | 3/2002 | Miyawaki et al. |
| 6,506,843 B1 | 1/2003 | Tsuda et al. |
| 2002/0086104 A1* | 7/2002 | Yabuta ............... C08G 59/4207 427/180 |
| 2005/0163925 A1 | 7/2005 | Sacripante et al. |
| 2012/0148948 A1 | 6/2012 | Ikeda et al. |

FOREIGN PATENT DOCUMENTS

| | | |
|---|---|---|
| JP | S54-011936 A | 1/1979 |
| JP | 4-65418 A | 3/1992 |
| JP | H10-158336 A | 6/1998 |
| JP | 2000-017197 A | 1/2000 |
| JP | 2003-176450 A | 6/2003 |
| JP | 2004-198752 A | 7/2004 |
| JP | 2005-213507 A | 8/2005 |
| JP | 2007-100100 A | 4/2007 |
| JP | 2012-128008 A | 7/2012 |
| JP | 2012-133288 A | 7/2012 |
| JP | 2015-131930 A | 7/2015 |

OTHER PUBLICATIONS

Nov. 4, 2015 Office Action issued in Japanese Patent Application No. 2014-186415.

\* cited by examiner

*Primary Examiner* — Terressa Boykin
(74) *Attorney, Agent, or Firm* — Oliff PLC

(57) ABSTRACT

A thermosetting powder coating material includes powder particles that contain a thermosetting resin A having a number average molecular weight equal to or greater than 100,000 from 5% by weight to 40% by weight with respect to the entirety of resins, and have a volume particle size distribution index GSDv equal to or less than 1.50.

19 Claims, No Drawings

THERMOSETTING POWDER COATING MATERIAL AND COATED PRODUCT

CROSS-REFERENCE TO RELATED APPLICATIONS

This application is based on and claims priority under 35 USC 119 from Japanese Patent Application No. 2014-186415 filed Sep. 12, 2014.

BACKGROUND

1. Technical Field

The present invention relates to a thermosetting powder coating material, and a coated product.

2. Related Art

In recent years, a powder coating technique using a powder coating material has attracted attention in terms of protection of the global environment, since only a small amount of volatile organic compound (VOC) is discharged in the coating process, and the powder coating material not attached to an object to be coated may be recovered and reused. Thus, various studies on the powder coating material have been performed.

SUMMARY

According to an aspect of the invention, there is provided a thermosetting powder coating material including:

powder particles that contain a thermosetting resin A having a number average molecular weight equal to or greater than 100,000 from 5% by weight to 40% by weight with respect to the entirety of resins, and have a volume particle size distribution index GSDv equal to or less than 1.50.

DETAILED DESCRIPTION

Hereinafter, exemplary embodiments which are examples of the invention will be described in detail.

Thermosetting Powder Coating Material

A thermosetting powder coating material (hereinafter, also referred to as "powder coating material") according to the exemplary embodiment contains powder particles that contain a thermosetting resin A having a number average molecular weight equal to or greater than 100,000 from 5% by weight to 40% by weight with respect to the entirety of resins, and have a volume particle size distribution index GSDv equal to or less than 1.50.

Moreover, the thermosetting powder coating material according to the exemplary embodiment may be any of a transparent powder coating material (clear coating) not including a colorant in the powder particles and a colored powder coating material including a colorant in the powder particles.

By using the thermosetting powder coating material according to the exemplary embodiment having the above configuration, a coating film which has high fluidity and high storage properties, and excellent smoothness and impact resistance, even when reducing the size of the powder particles, is obtained. The reason for this is not clear, but is considered to be as follows.

In recent years, in coating by the powder coating material, it has been required to form a thin coating film with a small amount of a powder coating material. Therefore, it is necessary to reduce the size of the powder particles of a powder coating material. However, if the size of the powder particles is reduced by a kneading and pulverizing method, the particle size distribution becomes wide, and coarse and fine particles are likely to occur.

When the amount of coarse particles in the powder particles is large, due to the coarse particles, irregularities are formed on the surface of the coating film, and smoothness of the coating film is likely to be reduced. In addition, when the amount of fine particles in the powder particles is large, fluidity of the powder particles is reduced and aggregation of the powder particles is likely to occur, and thus, the storage properties of the powder coating material itself are reduced, and smoothness of the coating film is likely to be reduced.

Therefore, the powder coating material according to the exemplary embodiment is configured to have a volume particle size distribution index GSDv of the powder particles equal to or less than 1.50. That is, the powder coating material according to the exemplary embodiment is made to have a narrow particle size distribution of the powder particles, and be a state in which the amount of coarse and fine particles is small. Thus, even when reducing the diameter of the powder particles, reduction of fluidity and aggregation (blocking) of the powder particles are prevented. As a result, the powder coating material according to the exemplary embodiment has high fluidity and storage properties (blocking resistance), and as a result, a coating film having excellent smoothness may be formed.

In addition, in the powder coating material in the related art, a technique for increasing hardness of a coating film by a high degree of crosslinking (by increasing crosslinking density) by combining a thermosetting resin having a number average molecular weight of about tens of thousands and a curing agent having a low molecular weight is adopted.

However, the coating film formed by the powder coating material in the related art is likely to be cracked or peeled off by an external impact due to such a high degree of crosslinking.

Thus, in the powder coating material according to the exemplary embodiment, powder particles containing the thermosetting resin A having a number average molecular weight equal to or greater than 100,000 from 5% by weight to 40% by weight with respect to the entirety of resins is used. When such powder particles are used, the thermosetting resin A itself exhibits high strength due to the high molecular weight thereof, and thus, even without a high degree of crosslinking being performed, a coating film having high strength may be formed. Furthermore, by the presence of the thermosetting resin A in the coating film, higher flexibility is imparted compared to a case of having a high degree of crosslinking, and thus, cracking or peeling in the coating film is prevented.

In this manner, by using the powder coating material according to the exemplary embodiment, a coating film having excellent impact resistance may be formed.

In particular, when the thermosetting resin A in the powder particles is present as a particle, particles configured of the thermosetting resin A are particles having elasticity and high strength, and thus, in the formed coating film, external impact is more likely to be mitigated, and impact resistance is further increased.

From the above, it is considered that by using the powder coating material according to the exemplary embodiment, a coating film having favorable fluidity and storage properties (blocking resistance), and excellent smoothness and impact resistance is formed.

In addition, even when reducing the size of the powder particles, the powder coating material according to the exemplary embodiment forms a coating film having high smoothness with a small amount thereof, and thus, glossiness of the obtained coating film also increased.

Furthermore, the powder coating material according to the exemplary embodiment has high storage properties, and thus, after powder coating, even when reusing the powder coating material not attached to the surface to be coated, in the same manner, formation of a coating film having high smoothness is achieved with a small amount thereof. Therefore, the powder coating material according to the exemplary embodiment has high durability.

In addition, due to high fluidity of the powder coating material according to the exemplary embodiment, the powder coating material according to the exemplary embodiment has high transfer efficiency and coating efficiency, and excellent coating workability.

Hereinafter, the powder coating material according to the exemplary embodiment will be described in detail.

The powder coating material according to the exemplary embodiment has the powder particles described above.

The powder coating material may include, if necessary, an external additive which is attached to the surface of the powder particles in addition to the powder particles from the viewpoint of increasing fluidity.

Powder Particles

The powder particles contain the thermosetting resin A having a number average molecular weight equal to or greater than 100,000 from 5% by weight to 40% by weight with respect to the entirety of resins, and have a volume particle size distribution index GSDv equal to or less than 1.50.

First, characteristics of the powder particles will be described.

Characteristics of Powder Particles

The volume particle size distribution index GSDv of the powder particles is equal to or less than 1.50, and is preferably equal to or less than 1.40, and more preferably equal to or less than 1.30 from the viewpoint of increasing smoothness of a coating film and increasing storage properties of a powder coating material.

In addition, the volume average particle diameter D50v of the resin particles is preferably from 1 μm to 25 μm, more preferably from 2 μm to 20 μm, and still more preferably from 3 μm to 15 μm from the viewpoint of forming a coating film having high smoothness with a small amount.

Here, the volume average particle diameter D50v and the volume particle size distribution index GSDv of the resin particles are measured using a Multisizer II (manufactured by Beckman Coulter, Inc.) and ISOTON-II (manufactured by Beckman Coulter, Inc.) as an electrolyte.

In the measurement, from 0.5 mg to 50 mg of a measurement sample is added to 2 ml of a 5% aqueous solution of surfactant (preferably sodium alkylbenzene sulfonate) as a dispersant. The obtained material is added to from 100 ml to 150 ml of the electrolyte.

The electrolyte in which the sample is suspended is subjected to a dispersion treatment using an ultrasonic disperser for 1 minute, and a particle size distribution of particles having a particle diameter from 2 μm to 60 μm is measured by a Coulter Multisizer II using an aperture having an aperture diameter of 100 μm. Moreover, 50,000 particles are sampled.

Cumulative distributions by volume are drawn from the side of the smallest diameter with respect to particle size ranges (channels) separated based on the measured particle size distribution. The particle diameter when the cumulative percentage becomes 1.6% is defined as a volume particle diameter D16v, while the particle diameter when the cumulative percentage becomes 50% is defined as that corresponding to a volume average particle diameter D50v. Furthermore, the particle diameter when the cumulative percentage becomes 84% is defined as a volume particle diameter D84v.

Furthermore, the volume average particle size distribution index (GSDv) is calculated as $(D84v/D16v)^{1/2}$.

In addition, the average circularity of powder particles is preferably equal to or greater than 0.96, more preferably equal to or greater than 0.97, and still more preferably equal to or greater than 0.98 from the viewpoint of increasing smoothness of a coating film and increasing storage properties of a powder coating material.

The average circularity of powder particles is measured by using a flow-type particle image analyzer "FPIA-3000 (manufactured by Sysmex Corporation)". Specifically, from 0.1 ml to 0.5 ml of a surfactant (alkylbenzene sulfonate) as a dispersing agent is added to from 100 ml to 150 ml of water in which solid impurities are removed in advance, and from 0.1 g to 0.5 g of a measurement sample is added thereto. The suspension in which the measurement sample is dispersed is subjected to a dispersion treatment using an ultrasonic disperser from 1 minute to 3 minutes, and the concentration of the dispersion is made to be from 3,000 particles/μl to 10,000 particles/μl. A measurement of the average circularity of powder particles is performed on the dispersion using a flow-type particle image analyzer.

Here, the average circularity of powder particles is a value obtained by determining a circularity (Ci) of each particle of n particles measured with respect to the powder particles and calculating by the following equation. Here, in the following equation, Ci represents a circularity (=perimeter of a circle equal to the projected area of a particle/perimeter of the particle projected image), and fi represents a frequency of the powder particles.

$$\text{Average circularity }(Ca) = \left(\sum_{i=1}^{n}(Ci \times fi)\right) \Big/ \sum_{i=1}^{n}(fi) \qquad \text{Equation 1}$$

Next, the materials configuring the powder particles will be described.

Thermosetting Resin A

The powder particles include the thermosetting resin A having a number average molecular weight equal to or greater than 100,000.

The thermosetting resin A has a number average molecular weight equal to or greater than 100,000, and a resin having a thermosetting reactive group. As the thermosetting resin A, various types of resin used in the powder particles of a powder coating material in the related art, having a number average molecular weight equal to or greater than 100,000 may be exemplified.

Moreover, the number average molecular weight of the thermosetting resin A is preferably from 100,000 to 5,000,000, and more preferably from 100,000 to 2,000,000 from the viewpoint of strength and synthesis.

In the exemplary embodiment, the number average molecular weight and weight average molecular weight of resins including the thermosetting resin A are measured by gel permeation chromatography (GPC). The molecular weight measurement by GPC is performed with a THF solvent using HLC-8120 GPC manufactured by Tosoh Corporation as a measurement device and column TSKgel Super HM-M (1.5 cm) manufactured by Tosoh Corporation. The weight average molecular weight and the number average molecular weight are calculated using a molecular weight calibration curve prepared by monodisperse polystyrene standard samples from the measurement results.

The thermosetting resin A may be a water-insoluble (hydrophobic) resin. When a water-insoluble (hydrophobic) resin is used as the thermosetting resin A, environmental dependence of charging characteristics of the powder coating material (powder particles) is reduced. In addition, in a case where the powder particles is manufactured by an aggregation and coalescence method, also from the viewpoint of realizing emulsification dispersion in an aqueous medium, the thermosetting resin A may be a water-insoluble (hydrophobic) resin. Moreover, water-insolubility (hydrophobicity) means that the dissolution amount of an object substance with respect to 100 parts by weight of water at 25° C. is less than 5 parts by weight.

Among the thermosetting resins A, at least one selected from the group consisting of a thermosetting (meth)acrylic resin and a thermosetting polyester resin is preferable.

Thermosetting Acrylic Resin

The thermosetting acrylic resin is a (meth)acrylic resin having a thermosetting reactive group.

A vinyl monomer having a thermosetting reactive group may be used to introduce a thermosetting reactive group into a (meth)acrylic resin. The vinyl monomer having a thermosetting reactive group may be a (meth)acrylic monomer (monomer having a (meth)acryloyl group), and may be a vinyl monomer other than (meth)acrylic monomer.

Here, examples of the thermosetting reactive group of a thermosetting (meth)acrylic resin include an epoxy group, a carboxyl group, a hydroxyl group, an amide group, an amino group, an acid anhydride group, and a block isocyanate group (isocyanate group blocked with a blocking agent). Among these, the thermosetting reactive group of a thermosetting (meth)acrylic resin is preferably at least one selected from the group consisting of an epoxy group, a carboxyl group, a hydroxyl group, and a block isocyanate group from the viewpoint of ease of producing the thermosetting (meth)acrylic resin.

Examples of the vinyl monomer having an epoxy group as the curable reactive group include various types of chain epoxy group-containing monomer (for example, glycidyl (meth)acrylate, β-methylglycidyl (meth)acrylate, glycidyl vinyl ether, and allylglycidyl ether), various types of (2-oxo-1,3-oxolane) group-containing vinyl monomer (for example, (2-oxo-1,3-oxolane)methyl (meth)acrylate), and various types of alicyclic epoxy group-containing vinyl monomer (for example, 3,4-epoxycyclohexyl (meth)acrylate, 3,4-epoxycyclohexylmethyl (meth)acrylate, and 3,4-epoxycyclohexylethyl (meth)acrylate).

Examples of the vinyl monomer having a carboxyl group as the curable reactive group include various types of carboxyl group-containing monomer (for example, (meth)acrylic acid, crotonic acid, itaconic acid, maleic acid, and fumaric acid), various types of mono ester of α,β-unsaturated dicarboxylic acid and monohydric alcohol having 1 to 18 carbon atoms (for example, monomethyl fumarate, monoethyl fumarate, monobutyl fumarate, monoisobutyl fumarate, mono tert-butyl fumarate, monohexyl fumarate, monooctyl fumarate, mono 2-ethylhexyl fumarate, monomethyl maleate, monoethyl maleate, monobutyl maleate, monoisobutyl maleate, mono tert-butyl maleate, monohexyl maleate, monooctyl maleate, and mono 2-ethylhexyl maleate), and monoalkyl itaconates (for example, monomethyl itaconate, monoethyl itaconate, monobutyl itaconate, monoisobutyl itaconate, monohexyl itaconate, monooctyl itaconate, and mono 2-ethylhexyl itaconate).

Examples of the vinyl monomer having a hydroxyl group as the curable reactive group include various types of hydroxyl group-containing (meth)acrylate (for example, 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, polyethylene glycol mono(meth)acrylate, and polypropylene glycol mono(meth)acrylate), addition reaction products of the above various types of hydroxyl group-containing (meth)acrylate and ε-caprolactone, various type of hydroxyl group-containing vinyl ether (for example, 2-hydroxyethyl vinyl ether, 3-hydroxypropyl vinyl ether, 2-hydroxypropyl vinyl ether, 4-hydroxybutyl vinyl ether, 3-hydroxybutyl vinyl ether, 2-hydroxy-2-methylpropyl vinyl ether, 5-hydroxypentyl vinyl ether, and 6-hydroxyhexyl vinyl ether), addition reaction products of the above various types of hydroxyl group-containing vinyl ether and ε-caprolactone, various types of hydroxyl group-containing allyl ether (for example, 2-hydroxyethyl (meth)allyl ether, 3-hydroxypropyl (meth)allyl ether, 2-hydroxypropyl (meth)allyl ether, 4-hydroxybutyl (meth)allyl ether, 3-hydroxybutyl (meth)allyl ether, 2-hydroxy-2-methylpropyl (meth)allyl ether, 5-hydroxypentyl (meth)allyl ether, and 6-hydroxyhexyl (meth)allyl ether), and addition reaction products of the above various types of hydroxyl group-containing allyl ether and ε-caprolactone.

Examples of the vinyl monomer having a block isocyanate group as the curable reactive group include 2-[(3,5-dimethyl pyrazolyl)carbonyl amino]ethyl methacrylate, 2-[(3-butylidene)aminooxycarbonylamino]ethyl methacrylate, 2-[(3,5-dimethyl pyrazolyl)carbonyl amino]ethyl acrylate, and 2-[(3-butylidene)aminooxycarbonylamino]ethyl acrylate.

The thermosetting (meth)acrylic resin may be a thermosetting resin in which vinyl monomers other than the (meth)acrylic monomer, having no thermosetting reactive group are copolymerized.

Examples of other vinyl monomers include various types of α-olefin (for example, ethylene, propylene, and 1-butene), various types of halogenated olefin except for fluoroolefin (for example, vinyl chloride and vinylidene chloride), various types of aromatic vinyl monomer (for example, styrene, α-methyl styrene, and vinyl toluene), various type of diester of unsaturated dicarboxylic acid and monohydric alcohol having 1 to 18 carbon atoms (for example, dimethyl fumarate, diethyl fumarate, dibutyl fumarate, dioctyl fumarate, dimethyl maleate, diethyl maleate, dibutyl maleate, dioctyl maleate, dimethyl itaconate, diethyl itaconate, dibutyl itaconate, and dioctyl itaconate), various types of acid anhydride group-containing monomer (for example, maleic anhydride, itaconic anhydride, citraconic anhydride, (meth)acrylic anhydride, and tetrahydrophthalic anhydride), various types of phosphoric ester group-containing monomer (for example, diethyl-2-(meth)acryloyloxyethyl phosphate, dibutyl-2-(meth)acryloyloxybutyl phosphate, dioctyl-2-(meth)acryloyloxyethyl phosphate, and diphenyl-2-(meth)acryloyloxyethyl phosphate), various types of hydrolyzable silyl group-containing monomer (for example, γ-(meth)acryloyloxypropyl trimethoxysilane, γ-(meth)acryloyloxypropyl triethoxysilane, and γ-(meth)acryloyloxypropylmethyl dimethoxysilane), various types of aliphatic vinyl carboxylate (for example, vinyl acetate, vinyl propionate, vinyl butyrate, vinyl isobutyrate, vinyl caproate, vinyl caprylate, vinyl caprate, vinyl laurate, branched aliphatic vinyl carboxylate having 9 to 11 carbon atoms, and vinyl stearate), and various types of vinyl ester of carboxylic acid having a cyclic structure (for example, vinyl cyclohexane carboxylate, vinyl methylcyclohexane carboxylate, vinyl benzoate, and vinyl p-tert-butyl benzoate).

Moreover, in the thermosetting (meth)acrylic resin, in a case where a vinyl monomer other than (meth)acrylic monomer is used as the vinyl monomer having a thermosetting reactive group, a (meth)acrylic monomer having no curable reactive group is used.

Examples of the (meth)acrylic monomer having no curable reactive group include alkyl (meth)acrylates (for example, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, cyclohexyl (meth)acrylate, 2-ethylhexyl (meth)acrylate, n-octyl (meth)acrylate, isooctyl (meth)acrylate, 2-ethyloctyl (meth)acrylate, docecyl (meth)acrylate, isodecyl (meth)acrylate, lauryl (meth)acrylate, and stearyl (meth)acrylate), various types of aryl (meth)acrylate (for example, benzyl (meth)acrylate, phenyl (meth)acrylate, and phenoxyethyl (meth)acrylate), various types of alkyl carbitol (meth)acrylate (for example, ethyl carbitol (meth)acrylate), other various types of (meth)acrylate (for example, isobornyl (meth)acrylate, dicyclopentanyl (meth)acrylate, dicyclopentenyl (meth)acrylate, dicyclopentenyloxyethyl (meth)acrylate, and tetrahydrofurfuryl (meth)acrylate), various types of amino group-containing amide unsaturated monomer (for example, N-dimethylaminoethyl (meth)acrylamide, N-diethylaminoethyl (meth)acrylamide, N-dimethylaminopropyl (meth)acrylamide, and N-diethylaminopropyl (meth)acrylamide), various types of dialkylaminoalkyl (meth)acrylate (for example, dimethylaminoethyl (meth)acrylate and diethylaminoethyl (meth)acrylate), and various types of amino group-containing monomer (for example, tert-butylaminoethyl (meth)acrylate, tert-butylaminopropyl (meth)acrylate, aziridinylethyl (meth)acrylate, pyrrolidinylethyl (meth)acrylate, and piperidinylethyl (meth)acrylate), and the like.

The thermosetting (meth)acrylic resin may be a resin having a crosslinked structure in a molecule.

The method of introducing a crosslinked structure in the thermosetting (meth)acrylic resin is not particularly limited, and a method using a monomer having a crosslinkable group described below may be exemplified.

As the monomer having a crosslinkable group, polyfunctional monomers having a radical polymerizable group such as a vinyl group or a (meth)acryloyl group may be exemplified.

Examples of the polyfunctional monomer having a radical polymerizable group include divinyl benzene, ethylene glycol dimethacrylate, diethylene glycol dimethacrylate, diethylene glycol diacrylate, triethylene glycol diacrylate, neopentyl glycol dimethacrylate, and neopentyl glycol diacrylate.

By using a polyfunctional monomer as described above, a crosslinked structure is formed in a molecule when a thermosetting (meth)acrylic resin is synthesized.

Thermosetting Polyester Resin

The thermosetting polyester resin is, for example, a polycondensate formed by polycondensating at least polybasic acid and polyol. The introduction of a thermosetting reactive group into the thermosetting polyester resin is performed by adjusting the amount used of the polybasic acid and the polyol. By the adjustment, a thermosetting polyester resin having at least one of a carboxyl group and a hydroxyl group as the thermosetting reactive group is obtained.

Examples of the polybasic acid include terephthalic acid, isophthalic acid, phthalic acid, methyl terephthalate, trimellitic acid, pyromellitic acid, and anhydrides of these acids; succinic acid, adipic acid, azelaic acid, sebacic acid, and anhydrides of these acids; maleic acid, itaconic acid, and anhydrides of these acids; fumaric acid, tetrahydrophthalic acid, methyl tetrahydrophthalic acid, hexahydrophthalic acid, methyl hexahydrophthalic acid, and anhydrides of these acids; and cyclohexane dicarboxylic acid, and 2,6-naphthalene dicarboxylic acid.

Examples of the polyol include ethylene glycol, diethylene glycol, propylene glycol, dipropylene glycol, 1,3-butanediol, 1,4-butanediol, 1,5-pentane diol, 1,6-hexane diol, neopentyl glycol, triethylene glycol, bis-hydroxyethyl terephthalate, cyclohexane dimethanol, octanediol, diethyl propanediol, butylethyl propanediol, 2-methyl-1,3-propanediol, 2,2,4-trimethyl pentanediol, hydrogenated bisphenol A, an ethylene oxide adduct of hydrogenated bisphenol A, a propylene oxide adduct of hydrogenated bisphenol A, trimethylol ethane, trimethylol propane, glycerin, pentaerythritol, trishydroxyethyl isocyanurate, and hydroxypivalyl hydroxypivalate.

The thermosetting polyester resin may be formed by polycondensating monomers other than polybasic acid and polyol.

Examples of the other monomers include compounds having both a carboxyl group and a hydroxyl group in a molecule (for example, dimethanol propionic acid and hydroxy pivalate), monoepoxy compounds (for example, glycidyl esters of branched aliphatic carboxylic acid such as "Cardura E10 (manufactured by Shell Co.)"), various monovalent alcohols (for example, methanol, propanol, butanol, and benzyl alcohol), various monovalent basic acids (for example, benzoic acid and p-tert-butyl benzoic acid), and various fatty acids (for example, castor oil fatty acid, coconut oil fatty acid, and soybean oil fatty acid).

The structure of the thermosetting polyester resin may be a branched structure or a linear structure. In addition, the thermosetting polyester resin may be a resin having a crosslinked structure in a molecule.

The thermosetting polyester resin preferably has the total of the acid value and the hydroxyl value from 10 mg KOH/g to 250 mg KOH/g.

When the total of the acid value and the hydroxyl value is within the above range, smoothness and mechanical properties of the coating film tend to increase.

Moreover, the measurement of the acid value and the hydroxyl value of the thermosetting polyester resin are performed according to JIS K-0070-1992.

The thermosetting resin A is preferably included as a particle in the powder particles from the viewpoint of obtaining a coating film having excellent impact resistance.

In order to make the particles of the thermosetting resin A easily absorb the impact from the outside, the average particle diameter of the particles of the thermosetting resin A is preferably within a range from 0.02 μm to 0.4 μm, and more preferably within a range from 0.1 μm to 0.4 μm.

Here, the average particle diameter of the particles of the thermosetting resin A in the powder particles is measured in the following manner.

That is, by embedding the powder particles in an epoxy resin and cutting using a diamond knife or the like, a thin slice is manufactured. The thin slice is observed by a transmission electron microscope (TEM), and a cross-sectional image of plural powder particles is photographed. The diameter of the resin particle portion is measured at 20 points on the cross-sectional image of the powder particles, and the average value is adopted.

The thermosetting resin A may be used alone or in combination of two or more types thereof.

The content of the thermosetting resin A is preferably from 5% by weight to 40% by weight, and more preferably from 5% by weight to 30% by weight with respect to the weight of the entirety of resins included in the powder particles.

Resin Other than Thermosetting Resin A

The powder particles may include a resin other than the thermosetting resin A.

In a case where the thermosetting resin A is included in a state of particles in the powder particles, the particles of the thermosetting resin A is preferably present in a dispersed state in an island shape in a continuous phase of the resin other than the thermosetting resin A. That is, the powder particles preferably has a sea-island structure having an island portion by the particles of the thermosetting resin A and a sea portion by a continuous phase of the resin other than the thermosetting resin A.

As one of the resin other than the thermosetting resin A, a thermosetting resin B having a number average molecular weight from 1,000 to 50,000 may be exemplified from the viewpoint of ensuring fluidity when heated.

The thermosetting resin B may have a number average molecular weight different from that of the thermosetting resin A described above. Thus, a thermosetting resin B is preferably at least one selected from the group consisting of a thermosetting (meth)acrylic resin and a thermosetting polyester resin. In addition, a thermosetting reactive group in the thermosetting resin B is preferably at least one selected from the group consisting of a hydroxyl group, a carboxy group, a block isocyanate group, and an epoxy group.

The content of the thermosetting reactive group in the thermosetting resin B is preferably from 0.5 times to 1.5 times, and particularly preferably from 0.6 times to 1.0 time of a functional group in the resin which contributes to curing.

The thermosetting resin B may be used alone or in combination of two or more types thereof.

The thermosetting resin B, as the total amount of the thermosetting resin B including the thermosetting resin A, is preferably included within a range equal to or greater than 90% by weight, and more preferably within a range equal to or greater than 95% by weight with respect to the weight of the entirety of resins included in the powder particles. That is, the entirety of resins included in the powder particles may be a resin formed of the thermosetting resin A and the thermosetting resin B.

As a preferable combination of the thermosetting resin A and the thermosetting resin B, a combination of a thermosetting (meth)acrylic resin and a thermosetting (meth)acrylic resin, a combination of thermosetting (meth)acrylic resin and a thermosetting polyester resin, and a combination of a thermosetting polyester resin and a thermosetting (meth)acrylic resin may be exemplified.

As the resin other than the thermosetting resin A and the thermosetting resin B, various types of resin used in the powder particles of a powder coating material in the related art may be exemplified. The resin other than the thermosetting resin A and the thermosetting resin B may or may not be a thermosetting resin.

The content of the resin other than the thermosetting resin A and the thermosetting resin B is preferably less than 10% by weight with respect to the weight of the entirety of resins included in the powder particles from the viewpoint of obtaining a coating film having excellent impact resistance.

In a case where a heat curing reaction occurs between a thermosetting functional group which the thermosetting resin (mainly, the thermosetting resin A and the thermosetting resin B) in the powder particles has and a functional group which the entirety of resins in the powder particles have, addition of a heat curing agent as described below may not be performed.

Hereinafter, in some cases, description will be made by collectively calling the entire thermosetting resins included in the powder particles, including the thermosetting resin A and the thermosetting resin B as "thermosetting resin".

Heat Curing Agent

The powder particles may include a heat curing agent. The heat curing agent is selected according to the type of thermosetting reactive group of a thermosetting resin.

Specifically, in a case where the thermosetting reactive group of the thermosetting resin is an epoxy group, examples of the thermosetting agent include acids such as succinic acid, glutaric acid, adipic acid, pimelic acid, suberic acid, azelaic acid, sebacic acid, dodecanedioic acid, eicosanedioic acid, maleic acid, citraconic acid, itaconic acid, glutaconic acid, phthalic acid, trimellitic acid, pyromellitic acid, tetrahydrophthalic acid, hexahydrophthalic acid, and cyclohexene-1,2-dicarboxylic acid; anhydrides of these acids; and urethane-modified products of these acids. Among these, as the thermosetting agent, aliphatic dibasic acid is preferable from the viewpoint of physical properties of a coating film and storage properties, and dodecanedioic acid is particularly preferable from the viewpoint of physical properties of a coating film.

In a case where the thermosetting reactive group of the thermosetting resin is a carboxyl group, examples of the thermosetting agent include various types of epoxy resin (for example, poly glycidyl ether of bisphenol A), epoxy group-containing acrylic resins (for example, glycidyl group-containing acrylic resin), various types of polyglycidyl ether of polyol (for example, 1,6-hexanediol, trimethylol propane, and trimethylol ethane), various types of polyglycidyl ester of polycarboxylic acid (for example, phthalic acid, terephthalic acid, isophthalic acid, hexahydrophthalic acid, methyl hexahydrophthalic acid, trimellitic acid, and pyromellitic acid), various types of alicyclic epoxy group-containing compound (for example, bis(3,4-epoxycyclohexyl)methyl adipate), and hydroxyamide (for example, triglycidyl isocyanurate and β-hydroxyalkylamide).

In a case where the thermosetting reactive group of the thermosetting resin is a hydroxyl group, examples of the thermosetting agent include poly block polyisocyanate and aminoplast. Examples of the poly block isocyanate include organic diisocyanate such as various types of aliphatic diisocyanate (for example, hexamethylene diisocyanate and trimethyl hexamethylene diisocyanate), various types of cyclic aliphatic diisocyanate (for example, xylylene diisocyanate and isophorone diisocyanate), and various types of aromatic diisocyanate (for example, tolylene diisocyanate and 4,4'-diphenylmethane diisocyanate); adducts of these organic diisocyanates and polyol, a low molecular weight polyester resin (for example, polyester polyol), or water; polymer of these organic diisocyanates (polymer including an isocyanurate type polyisocyanate compound); products obtained by blocking various types of polyisocyanate compound such as an isocyanate-biuret product with blocking agents known in the related art; and self-block polyisocyanate compounds having a urethodione bond as a structural unit.

The heat curing agent may be used alone or in combination of two or more types thereof.

The content of the heat curing agent is, for example, preferably from 1 by weight to 30% by weight, and more preferably from 3% by weight to 20% by weight with respect to the entire thermosetting resin.

Colorant

As the colorant contained in the powder particles, pigments may be exemplified. In the colorant, a pigment may be used in combination with a dye.

Examples of the pigment include inorganic pigments such as iron oxide (for example, red iron oxide), titanium oxide, titan yellow, zinc oxide, white lead, zinc sulfide, lithopone, antimony oxide, cobalt blue, and carbon black; organic pigments such as quinacridone red, phthalocyanine blue, phthalocyanine green, permanent red, hansa yellow, indanthrene blue, brilliant fast scarlet, and benzimidazolone yellow.

As the pigment, other than the above, brilliant pigments may be exemplified. Examples of the brilliant pigment include a pearl pigment, metal powder such as aluminum powder and stainless steel powder; metal flakes; glass beads; glass flakes; mica; and scaly iron oxide (MIO).

The colorant may be used alone or in combination of two or more types thereof.

The content of the colorant is selected according to the type of pigment, color, brightness, and depth required for a coating film. For example, the content of the colorant is preferably from 1% by weight to 70% by weight, and more preferably from 2% by weight to 60% by weight with respect to the entirety of resins of the powder particles.

Other Additives

As other additives, various types of additive used in the powder coating material may be exemplified. Specifically, examples of other additives include a surface conditioner (silicone oil, acrylic oligomer, and the like), a foam inhibitor (for example, benzoin and benzoin derivatives), a curing accelerator (an amine compound, an imidazole compound, a cationic polymerization catalyst, and the like), a plasticizer, a charge-controlling agent, an antioxidant, a pigment dispersant, a flame retardant, a fluidity-providing agent, and the like.

Form of Powder Particles

The form of the powder particles may be particles having a single-layer structure, or particles having a so-called core-shell structure configured of a core and a resin coating portion coating the core.

In a case where the powder particles are particles having the core-shell structure, the content of the thermosetting resin A is a total content of the thermosetting resin A in the core and the coating layer, and the proportion of the thermosetting resin A included in the entirety of resins in the core and the resin coating portion is from 5% by weight to 40% by weight. The content in a case where the powder particles include the thermosetting resin B also refers to the total content of the thermosetting resin B in the core and the resin coating portion, in the same manner as the thermosetting resin A.

In addition, in a case where the powder particles are particles having a core-shell structure, the entirety of resins in the powder particles refer to the total amount of resin in the core and the resin coating portion.

A case where the powder particles are particles having a core-shell structure is described below.

Core

The core includes the thermosetting resin A and a resin other than the thermosetting resin A, and if necessary, the core preferably includes a heat curing agent, a colorant, or other additives.

Here, each component configuring the core is a component described above.

Resin Coating Portion

The resin coating portion includes a resin. The resin coating portion may be configured of only a resin, or may include other additives (heat curing agent, or other additives).

However, from the viewpoint of reducing a phenomenon in which inclusions (other additives such as a heat curing agent, a colorant, and a leveling agent added as necessary, in addition to the heat curing agent) in the powder particles are deposited (hereinafter, referred to as "bleed"), the resin coating portion may be configured of only a resin. Moreover, even in a case where the resin coating portion includes other additives, a resin may occupy 90% weight or greater (preferably 95% by weight or greater) of the entirety of the resin coating portion.

The resin of the resin coating portion may be a non-thermosetting resin, or may be a thermosetting resin. However, the resin of the resin coating portion may be a thermosetting resin from the viewpoint of improving a curing density (crosslinking density) of a coating film. In a case of applying a thermosetting resin as the resin of the resin coating portion, as the thermosetting resin, the same resin as the thermosetting resin of the core may be exemplified. In particular, even in a case of applying a thermosetting resin as the resin of the resin coating portion, the thermosetting resin is preferably at least one selected from the group consisting of a thermosetting (meth)acrylic resin and a thermosetting polyester resin. However, the thermosetting resin of the resin coating portion may be the same type as or different type from the thermosetting resin of the core.

Moreover, even in a case of applying a non-thermosetting resin as the resin of the resin coating portion, as the non-thermosetting resin, at least one selected from the group consisting of an acrylic resin and a polyester resin is suitably exemplified.

The coverage ratio of the resin coating portion is preferably from 30% to 100%, and more preferably from 50% to 100% from the viewpoint of control of bleeding.

The coverage ratio of the resin coating portion is a value measured by the following method.

That is, the coverage ratio of the resin coating portion on the powder particle surface is determined by a XPS (X-ray photoelectron spectroscopy) measurement.

Specifically, the XPS measurement is performed by using JPS-9000MX manufactured by JEOL Ltd as a measuring device and a MgKα line as an X-ray source, and by setting the acceleration voltage to 10 kV and the emission current to 30 mA.

By peak separation of a component resulting from the material of the core on the powder particle surface and a component resulting from the material of the resin coating portion from the spectrum obtained under the above conditions, the coverage ratio of the resin coating portion on the powder particle surface is obtained. In the peak separation, the measured spectrum is separated into each component using curve fitting by the least square method.

As the component spectra which are a base of the separation, spectra obtained by separately measuring the thermosetting resin, other resins, the heat curing agent, a colorant (pigment), other additives, and the resin for the resin coating portion used in manufacture of the powder particles are used. Furthermore, the coverage ratio is obtained from the ratio of the spectral intensity resulting from the resin for the resin coating portion with respect to the total of the entire spectral intensity obtained in the powder particles.

The thickness of the resin coating portion is preferably from 0.2 μm to 4 μm, and more preferably from 0.3 μm to 3 μm from the viewpoint of control of bleeding.

The thickness of the resin coating portion is a value measured by the following method.

That is, by embedding the powder particles in an epoxy resin and cutting using a diamond knife or the like, a thin slice is manufactured. The thin slice is observed by a transmission electron microscope (TEM), and a cross-sectional image of plural powder particles is photographed. The thicknesses of the resin coating portion are measured at 20 points on the cross-sectional image of the powder particles, and the average value is adopted.

Moreover, in a case where observation of the resin coating portion in the cross-sectional image is difficult due to a clear coating material or the like, by performing staining, it is possible to make observation and measurement easier.

Metal Ion

The powder particles may include divalent or higher metal ions (hereinafter, also simply referred to as "metal ion"). In a case where powder particles are particles having a core-shell structure, the metal ion is a component contained in any of the core and the resin coating portion.

When divalent or higher metal ions are included in powder particles, ion crosslinking by the metal ions in the powder particles is formed. For example, when a polyester resin is applied as a thermosetting resin of the core and a resin of the resin coating portion, a carboxyl group or a hydroxyl group of the polyester resin interacts with a metal ion, and due to this, ion crosslinking is formed. By the ion crosslinking, bleeding of the powder particles is prevented, and storage properties are likely to increase. In addition, in the ion crosslinking, by heat when heat curing is performed after the powder coating material is coated, bond of the ion crosslinking is broken, and thus, the melt viscosity of the powder particles is reduced, and a coating film having high smoothness is likely to be formed.

As the metal ion, metal ions from divalent to tetravalent may be exemplified. Specifically, as the metal ions, at least one type of metal ion selected from the group consisting of an aluminum ion, a magnesium ion, an iron ion, a zinc ion, and a calcium ion may be exemplified.

Examples of a supply source (compound included in the powder particles as an additive) of metal ions include a metal salt, an inorganic metal salt polymer, and a metal complex. For example, in a case where powder particles are manufactured by an aggregation and coalescence method, the metal salt or the inorganic metal salt polymer are added to the powder particles as a coagulant.

Examples of the metal salt include aluminum sulfate, aluminum chloride, magnesium chloride, magnesium sulfate, iron (II) chloride, zinc chloride, calcium chloride, and calcium sulfate.

Examples of the inorganic metal salt polymer include poly aluminum chloride, poly aluminum hydroxide, poly iron (II) sulfate, and calcium polysulfide.

Examples of the metal complex include metal salts of aminocarboxylic acid. Specific examples of the metal complex include metal salts (for example, a calcium salt, a magnesium, an iron salt, and an aluminum salt) based on known chelates such as ethylenediaminetetraacetic acid, propanediaminetetraacetic acid, nitrilotriacetic acid, triethylenetetraminehexaacetic acid, and diethylenetriaminepentaacetic acid.

Moreover, the supply source of these metal ions may be added as a simple additive rather than application as a coagulant.

As the valence of the metal ion is larger, a net shape ion crosslinking is likely to be formed, and it is suitable from the viewpoint of smoothness of a coating film and storage properties of a powder coating material. Thus, as the metal ion, an Al ion is preferable. That is, as a supply source of the metal ion, aluminum salts (for example, aluminum sulfate and aluminum chloride), aluminum salt polymers (for example, poly aluminum chloride and poly aluminum hydroxide) are preferable. Furthermore, from the viewpoint of smoothness of a coating film and storage properties of a powder coating material, among the supply sources of the metal ion, the inorganic metal salt polymer is preferable compared to the metal salt even in a case where the valences of metal ions are the same. Thus, as the supply source of the metal ion, in particular, aluminum salt polymers (for example, poly aluminum chloride and poly aluminum hydroxide) are preferable.

The content of the metal ion is preferably from 0.002% by weight to 0.2% by weight, and more preferably from 0.005% by weight to 0.15% by weight with respect to the entire powder particles from the viewpoint of smoothness of a coating film and storage properties of a powder coating material.

When the content of the metal ion is equal to or greater than 0.002% by weight, suitable ion crosslinking by the metal ion is formed, bleed of powder particles is prevented, and storage properties of a coating material are likely to increase.

On the other hand, when the content of the metal ion is equal to or less than 0.2% by weight, formation of excessive ion crosslinking by the metal ion is prevented, and smoothness of a coating film is likely to increase.

Here, in a case where powder particles are manufactured by aggregation and coalescence method, the supply source (metal salt or metal salt polymer) of metal ions added as a coagulant contributes to control of the particle size distribution and the shape of the powder particles.

Specifically, it is suitable from the viewpoint of the fact that as the valence of the metal ion is larger, a narrower particle size distribution is obtained. In addition, from the viewpoint of obtaining a narrow particle size distribution, the metal salt polymer is suitable compared to the metal salt even in a case where the valences of metal ions are the same. For this reason, from these points, as the supply source of the metal ions, aluminum salts (for example, aluminum sulfate and aluminum chloride), aluminum salt polymers (for example, poly aluminum chloride and poly aluminum hydroxide) are preferable, and aluminum salt polymers (for example, poly aluminum chloride and poly aluminum hydroxide) are particularly preferable.

In addition, when adding a coagulant such that the content of the metal ion becomes equal to or greater than 0.002% by weight, aggregation of the resin particles in an aqueous medium proceeds, and this contributes to realization of a narrow particle size distribution. In addition, aggregation of the resin particles which become a resin coating portion with respect to aggregation particles which become a core proceeds, and this contributes to realization of formation of the resin coating portion with respect to the entire core surface. On the other hand, when adding a coagulant such that the content of the metal ion becomes equal to or less than 0.2% by weight, excessive formation of ion crosslinking in the aggregation particles is prevented, and when performing coalescence, the shape of the powder particles formed is likely to be close to a spherical shape.

Thus, from these points, the content of the metal ion is preferably from 0.002% by weight to 0.2% by weight, and more preferably from 0.005% by weight to 0.15% by weight.

The content of the metal ion is measured by quantitatively analyzing the fluorescent X-ray intensity of the powder particles. Specifically, for example, first, a resin and a supply source of the metal ion are mixed, whereby a resin mixture having a known concentration of the metal ion is obtained. 200 mg of the resin mixture is put into a tablet shaper having a diameter of 13 mm and pressure is applied thereto, whereby a pellet sample is obtained. The weight of the pellet sample is precisely weighed, a fluorescent X-ray intensity measurement is performed on the pellet sample to determine the peak intensity. In the same manner, measurements are performed on pellet samples in which the amount of the supply source of the metal ion added is changed, and from these results, a calibration curve is obtained. Furthermore, using the calibration curve, the content of the metal ion in the powder particles which are measuring objects is quantitatively analyzed.

As the method for adjusting the content of the metal ion, 1) a method for adjusting the amount of the supply source of the metal ion added, and 2) a method for adjusting the content of the metal ion in which in a case of manufacturing the powder particles by an aggregation and coalescence method, in the aggregation process, after adding a coagulant (for example, a metal salt, or a metal salt polymer) as a supply source of the metal ion, a chelating agent (for example, EDTA (ethylenediaminetetraacetic acid), DTPA (diethylenetriaminepentaacetic acid), or NTA (nitrilotriacetic acid)) is added at the end of the aggregation process, and by the chelating agent, metal ions and a complex are formed, and the formed complex is removed in a washing process, whereby the content of the metal ion is adjusted.

External Additive

Since the external additive prevents generation of aggregation between the powder particles which are attached, using a small amount of the external additive, a coating film having high smoothness is formed.

Specific examples of the external additive include inorganic particles. As the inorganic particles, particles of $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO.SiO_2$, $K_2O.(TiO_2)_n$, $Al_2O_3.2SiO_2$, $CaCO_3$, $MgCO_3$, $BaSO_4$, and $MgSO_4$ may be exemplified. Among these, silica or titania is preferably used.

Surfaces of the inorganic particles as an external additive may be subjected to a hydrophobizing treatment. The hydrophobizing treatment is performed by, for example, dipping the inorganic particles in a hydrophobizing agent. The hydrophobizing agent is not particularly limited and examples thereof include a silane coupling agent, silicone oil, a titanate coupling agent, and an aluminum coupling agent. These may be used alone or in combination of two or more types thereof.

Generally, the amount of the hydrophobizing agent is, for example, from 1 part by weight to 10 parts by weight with respect to 100 parts by weight of the inorganic particles.

The amount of the external additive externally added is, for example, preferably from 0.01% by weight to 5% by weight, and more preferably from 0.01% by weight to 2.0% by weight with respect to the powder particles.

Production Method of Powder Coating Material

Next, the production method of a powder coating material according to the exemplary embodiment will be described.

The powder coating material according to the exemplary embodiment is obtained by externally adding an external additive with respect to powder particles, if necessary, after manufacturing of the powder particles.

The powder particles may be manufactured using any of a dry production method (for example, kneading and pulverizing method) and a wet production method (for example, aggregation and coalescence method, suspension and polymerization method, and dissolution and suspension method). The production method of the powder particles is not particularly limited to these production methods, and a known production method is employed.

Among these, from the viewpoint of the fact that a volume particle size distribution index GSDv, a volume average particle diameter D50v, and an average circularity may be easily controlled to be in the above range, powder particles may be obtained by the aggregation and coalescence method.

Specifically, the powder particles are preferably obtained by forming aggregation particles by aggregating at least resin particles including the thermosetting resin A dispersed in a dispersion and heating and coalescing the aggregation particles.

Here, in the dispersion in which the resin particles are dispersed, a heat curing agent may be included (that is, a heat curing agent may be included in the aggregation particles), if necessary.

In addition, in a case where the powder particles are particles having a core-shell structure, the powder particles is preferably obtained by the following method.

That is, the powder particles is preferably produced through (1) a process of forming the first aggregation particles by aggregating the first resin particles and the second resin particles in a dispersion in which the first resin particles including a thermosetting resin A, and the second resin particles including a resin other than the thermosetting resin A are dispersed, or by aggregating the composite particles in a dispersion in which the composite particles including the thermosetting resin A, and a resin other than the thermosetting resin A are dispersed, (2) a process of forming the second aggregation particles in which the third resin particles are attached on the surface of the first aggregation particles by mixing the first aggregation particle dispersion in which the first aggregation particles are dispersed and the third resin particle dispersion in which the third resin particles including a resin are dispersed, and aggregating the third resin particles on the surface of the first aggregation particles, and a process of heating the second aggregation particle dispersion in which the second aggregation particles are dispersed and coalescing the second aggregation particles.

Here, if necessary, a heat curing agent may be included in the dispersion used in the process (1) (heat curing agent may be included in the first aggregation particles).

Moreover, the powder particles produced by the aggregation and coalescence method are particles having a core-shell structure in which the portion in which the first aggregation particles are coalesced becomes a core, and the portion in which the second resin particles attached to the surface of the first aggregation particles coalesced becomes a resin coating portion.

Hereinafter, each process will be described in detail.

Moreover, in the following description, a production method of powder particles using a heat curing agent and a colorant will be described, and the heat curing agent and the colorant are those used as necessary.

Each Dispersion Preparation Process

First, each dispersion to be used is prepared by an aggregation and coalescence method.

Specifically, a first resin particle dispersion in which first resin particles including a thermosetting resin A for a core are dispersed, a second resin particle dispersion in which second resin particles including a resin other than the thermosetting resin A for a core are dispersed, a heat curing agent dispersion in which a heat curing agent is dispersed, a colorant dispersion in which a colorant is dispersed, and a third resin particle dispersion in which third resin particles including a resin for a resin coating portion is dispersed are prepared.

In addition, in another example, instead of the first resin particle dispersion, the second resin particle dispersion, and the heat curing agent dispersion in which a heat curing agent is dispersed, a composite particle dispersion in which composite particles including a thermosetting resin A for a core, a resin other than the thermosetting resin A, and a heat curing agent are dispersed is prepared.

Moreover, in each process of the production method of the powder coating material, the first resin particles, the second resin particles, third resin particles, and composite particles generally are referred to as "resin particles", and dispersions of these resin particles are referred to as "resin particle dispersions".

Here, the resin particle dispersion is prepared by, for example, dispersing resin particles by a surfactant in a dispersion medium.

Examples of the dispersion medium used for the resin particle dispersion include aqueous media.

Examples of the aqueous media include water such as distilled water and ion exchange water; alcohols; and the like. These may be used alone or in combination of two or more types thereof.

Examples of the surfactant include anionic surfactants such as sulfuric ester salt, sulfonate, phosphate, and soap-based anionic surfactants; cationic surfactants such as amine salt and quaternary ammonium salt cationic surfactants; and nonionic surfactants such as polyethylene glycol, alkyl phenol ethylene oxide adduct, and polyol nonionic surfactants. Among these, anionic surfactants and cationic surfactants are particularly used. Nonionic surfactants may be used in combination with anionic surfactants or cationic surfactants.

The surfactants may be used alone or in combination of two or more types thereof.

Regarding the resin particle dispersion, as a method for dispersing the resin particles in the dispersion medium, a common dispersing method using, for example, a rotary shearing-type homogenizer, or a ball mill, a sand mill, or a Dyno mill having media may be exemplified. In addition, depending on the type of resin particles, resin particles may be dispersed in the resin particle dispersion using, for example, a phase inversion emulsification method.

The phase inversion emulsification method includes: dissolving a resin to be dispersed in a hydrophobic organic solvent in which the resin is soluble; conducting neutralization by adding a base to an organic continuous phase (O phase); and converting the resin (so-called phase inversion) from W/O to O/W by putting an aqueous medium (W phase) to form a discontinuous phase, thereby dispersing the resin in the aqueous medium in a particle shape.

As the production method of the resin particle dispersion, specifically, the following method may be exemplified.

For example, in a case where the resin particle dispersion is an acrylic resin particle dispersion in which acrylic resin particles are dispersed, the acrylic resin particle dispersion is obtained by emulsifying a raw material monomer in an aqueous medium, adding a water-soluble initiator and if necessary, a chain-transfer agent for controlling a molecular weight and heating, and performing emulsion polymerization.

In addition, in a case where the resin particle dispersion is a polyester resin particle dispersion in which polyester resin particles are dispersed, the polyester resin particle dispersion is obtained by heating and melting a raw material monomer and polycondensing under reduced pressure, dissolving the obtained polycondensate by adding a solvent (for example, ethyl acetate), stirring while adding an alkaline aqueous solution to the obtained dissolved material, and performing phase inversion emulsification.

Moreover, in a case where the resin particle dispersion is a composite particle dispersion, the composite particle dispersion is obtained by mixing a resin (thermosetting resin A and resin other than the thermosetting resin A) and a heat curing agent, and dispersing (for example, emulsification such as phase inversion emulsification) the mixture in a dispersion medium.

The volume average particle diameter of the resin particles dispersed in the resin particle dispersion may be, for example, equal to or less than 1 μm, is preferably from 0.01 μm to 1 μm, and more preferably from 0.08 μm to 0.8 μm, and still more preferably from 0.1 μm to 0.6 μm.

Moreover, regarding the volume average particle diameter of the resin particles, a cumulative distribution by volume is drawn from the side of the smallest diameter with respect to particle size ranges (channels) separated using the particle size distribution obtained by the measurement of a laser diffraction-type particle size distribution measuring apparatus (for example, manufactured by Horiba, Ltd., LA-700), and a particle diameter when the cumulative percentage becomes 50% with respect to the entirety of the particles is measured as a volume average particle diameter D50v. Moreover, the volume average particle diameter of the particles in other dispersions is also measured in the same manner.

The content of the resin particles included in the resin particle dispersion is, for example, preferably from 5% by weight to 50% by weight, and more preferably from 10% by weight to 40% by weight.

Moreover, for example, a heat curing agent dispersion and a colorant dispersion are also prepared in the same manner as in the case of the resin particle dispersion. That is, the resin particles in the resin particle dispersion are the same as the colorant particles dispersed in the colorant dispersion and the particles of the heat curing agent dispersed in the curing agent dispersion, in terms of the volume average particle diameter, the dispersion medium, the dispersing method, and the content of the particles.

First Aggregation Particle Forming Process

Next, the first resin particle dispersion, the second resin particle dispersion, the heat curing agent dispersion, and the colorant dispersion are mixed.

Furthermore, the first resin particles, the second resin particles, a heat curing agent, and a colorant are heterogeneously aggregated in the mixed dispersion, whereby first aggregation particles having a diameter near a target powder particle diameter and including the first resin particles, the second resin particles, the heat curing agent, and the colorant are formed.

Specifically, for example, a coagulant is added to the mixed dispersion and a pH of the mixed dispersion is adjusted for acidity (for example, the pH is from 2 to 5). If necessary, a dispersion stabilizer is added. Then, the mixed dispersion is heated at a temperature of the glass transition temperature of the first resin particles (specifically, for example, from a temperature 30° C. lower than the glass transition temperature of the first resin particles to a temperature 10° C. lower than the glass transition temperature) to aggregate the particles dispersed in the mixed dispersion, whereby the first aggregation particles are formed.

In a first aggregation particle forming process, the first aggregation particles may be formed by mixing the composite particle dispersion including the thermosetting resin A, a resin other than the thermosetting resin A, and a heat curing agent and the colorant dispersion, and heterogeneously aggregating the composite particles and the colorant in the mixed dispersion.

In the first aggregation particle forming process, for example, the coagulant may be added at room temperature (for example, 25° C.) under stirring of the mixed dispersion using a rotary shearing-type homogenizer, the pH of the mixed dispersion may be adjusted for acidity (for example, pH is from 2 to 5), a dispersion stabilizer may be added if necessary, and the heating may then be performed.

Examples of the coagulant include a surfactant having an opposite polarity to the polarity of the surfactant used as the dispersant to be added to the mixed dispersion, a metal salt, a metal salt polymer, and a metal complex. In a case where the metal complex is used as the coagulant, the amount of the surfactant used is reduced, and charging characteristics are improved.

Moreover, after aggregation, if necessary, an additive may be used to form a complex or a similar bond with the metal ions of the coagulant. A chelating agent is preferably used as the additive. In a case where the coagulant is added in excess, by adding the chelating agent, adjustment of the content of the metal ion of the powder particles is achieved.

Here, a metal salt, a metal salt polymer, and metal complex as a coagulant are used as a supply source of the metal ions. Examples of these are as described above.

As the chelating agent, a water-soluble chelating agent may be exemplified. Specific examples of the chelating agent include oxycarboxylic acids such as tartaric acid, citric acid, and gluconic acid, iminodiacetic acid (IDA), nitrilotriacetic acid (NTA), and ethylenediaminetetraacetic acid (EDTA).

The amount of the chelating agent added may be, for example, from 0.01 parts by weight to 5.0 parts by weight, and is preferably from 0.1 parts by weight to less than 3.0 parts by weight with respect to 100 parts by weight of the resin particles.

Second Aggregation Particle Forming Process

Next, the first aggregation particle dispersion in which the obtained first aggregation particles are dispersed and the third resin particle dispersion are mixed.

Moreover, the third resin particles may be the same as or different from the first resin particles or the second resin particles.

Furthermore, in the mixed dispersion in which the first aggregation particles and the third resin particles are dispersed, the third resin particles are aggregated so as to be attached to the surface of the first aggregation particles, and thereby, the second aggregation particles in which the third resin particles are attached to the surface of the first aggregation particles are formed.

Specifically, for example, in the first aggregation particle formation process, when the particle diameter of the first aggregated particles reaches a target particle diameter, the third resin particle dispersion is mixed with the first aggregation particle dispersion, and heating is performed on the mixed dispersion at a temperature equal to or lower than the glass transition temperature of the third resin particles.

Furthermore, by adjusting the pH of the mixed dispersion, for example, to be within a range from about 6.5 to about 8.5, the progress of the aggregation stops.

As a result, the second aggregation particles in which the third resin particles are aggregated so as to be attached on the surface of the first aggregation particles are obtained.

Coalescence Process

Next, the second aggregation particle dispersion in which the second aggregation particles are dispersed is heated at, for example, a temperature equal to or higher than the glass transition temperatures of the first, the second, and the third resin particles (for example, temperature equal to or higher than the glass transition temperatures of the first, the second, and the third resin particles by 10° C. to 30° C.) to coalesce the second aggregation particles and form powder particles.

Through the processes described above, powder particles are obtained.

After the coalescence process ends, the powder particles formed in a dispersion are subjected to a washing process, a solid-liquid separation process, and a drying process, that are well known, whereby dry powder particles are obtained.

In the washing process, displacement washing using ion exchange water may be sufficiently performed from the viewpoint of charging properties. In addition, the solid-liquid separation process is not particularly limited, but suction filtration, pressure filtration, or the like may be performed from the viewpoint of productivity. In addition, the method for the drying process is also not particularly limited, but freeze drying, airflow type drying, fluidized drying, vibration type fluidized drying, or the like may be performed from the viewpoint of productivity.

In addition, the powder particles according to the exemplary embodiment are produced by, if necessary, for example, adding and mixing an external additive with the obtained dry powder particles.

The mixing may be performed using, for example, a V-blender, a Henschel mixer, or a Lödige mixer.

Furthermore, if necessary, coarse toner particles may be removed using a vibration sieving machine, a wind-power sieving machine, or the like.

Coated Product and Production Method of Coated Product

The coated product according to the exemplary embodiment is a coated product having a coating film formed with the powder coating material according to the exemplary embodiment on the surface of an object to be coated. Furthermore, the production method of the coated product according to the exemplary embodiment is a production method of a coated product for forming a coating film with the powder coating material according to the exemplary embodiment on the surface of an object to be coated.

Specifically, a coated product is obtained by coating the powder coating material on the surface of an object to be coated, performing heat curing of the powder coating material by heating (baking), and thereby, forming a coating film.

As the coating method of the powder coating material, well-known coating methods such as electrostatic powder coating, a friction charge powder coating, and fluidized dipping may be used. The thickness of the coating film by the powder coating material may be, from 30 μm to 50 μm.

The heating temperature (baking temperature) is, for example, preferably from 90° C. to 250° C., more preferably from 100° C. to 220° C., and still more preferably from 120° C. to 200° C. Moreover, the heating time (baking time) is controlled according to the heating temperature (baking temperature).

Moreover, coating of the powder coating material, and the heating (baking) may be performed together.

An object to be coated which is a target object to be coated with the powder coating material is not particularly limited, and examples thereof include various metal parts, ceramic parts, and resin parts. These target objects may be a non-molded article before being molded to each article such as a plate shape article, or a line shape article, or may be a molded article molded to be used for electronic parts, road vehicles, building interior and exterior materials. In addition, the target object may be an article subjected to a surface treatment such as a primer treatment, a plating treatment, or electrodeposition on the surface to be coated of the target object in advance.

EXAMPLES

Hereinafter, this exemplary embodiment will be described in detail using examples, but is not limited to these examples. In the following description, unless specifically noted, "parts" and "%" are based on weight.

Preparation of Resin Particle Dispersion

Preparation of Resin Particle Dispersion A1

| | |
|---|---|
| Styrene | 238 parts |
| n-Butyl acrylate | 80 parts |
| Hydroxyethyl methacrylate | 81 parts |
| Acrylic acid | 4 parts |

A monomer mixture is prepared by mixing the above.

5 parts of a nonionic surfactant (manufactured by Dai-ichi Kogyo Seiyaku Co., Ltd.: NOIGEN EA-157) and 7 parts of an anionic surfactant (manufactured by Dai-ichi Kogyo Seiyaku Co., Ltd.: NEOGEN SC) are dissolved in 550 parts of ion exchange water in a flask, then, 50 parts of ion exchange water in which 3.7 parts of potassium persulfate is dissolved are added thereto, and after performing nitrogen substitution, the solution is heated to be 50° C. while stirring the solution in the flask, and the above monomer mixture is added to the solution over 90 minutes. After the addition ends, emulsion polymerization is continued for 5 hours. In this manner, a dispersion A1 in which acrylic resin particles having a volume average particle diameter of 160 nm and a number average molecular weight (Mn) of 130,000 are dispersed is obtained.

Preparation of Resin Particle Dispersion A2

A dispersion A2 in which acrylic resin particles having a volume average particle diameter of 150 nm and a number average molecular weight (Mn) of 103,000 are dispersed is obtained in the same manner as in Preparation of resin particle dispersion A1 except that the heating temperature of the solution in the flask is changed from 50° C. to 63° C.

Preparation of Resin Particle Dispersion A3

| | |
|---|---|
| Styrene | 230 parts |
| n-Butyl acrylate | 80 parts |
| Divinylbenzene | 8 parts |
| Hydroxyethyl methacrylate | 81 parts |
| Acrylic acid | 4 parts |

A monomer mixture is prepared by mixing the above.

5 parts of a nonionic surfactant (manufactured by Dai-ichi Kogyo Seiyaku Co., Ltd.: NOIGEN EA-157) and 7 parts of an anionic surfactant (manufactured by Dai-ichi Kogyo Seiyaku Co., Ltd.: NEOGEN SC) are dissolved in 550 parts of ion exchange water in a flask, then, 50 parts of ion exchange water in which 3.7 parts of potassium persulfate is dissolved are added thereto, and after performing nitrogen substitution, the solution is heated to be 50° C. while stirring the solution in the flask, and the above monomer mixture is added to the solution over 90 minutes. After the addition ends, emulsion polymerization is continued for 5 hours. In this manner, a dispersion A3 in which acrylic resin particles having a volume average particle diameter of 155 nm, a number average molecular weight (Mn) in the soluble part of 105,000, and a crosslinked structure are dispersed is obtained.

Preparation of Resin Particle Dispersion A4

| | |
|---|---|
| Styrene | 263 parts |
| n-Butyl acrylate | 113 parts |
| Methacrylic acid | 24.8 parts |

A monomer mixture is prepared by mixing the above.

5 parts of a nonionic surfactant (manufactured by Dai-ichi Kogyo Seiyaku Co., Ltd.: NOIGEN EA-157) and 7 parts of an anionic surfactant (manufactured by Dai-ichi Kogyo Seiyaku Co., Ltd.: NEOGEN SC) are dissolved in 550 parts of ion exchange water in a flask, then, 50 parts of ion exchange water in which 3.7 parts of potassium persulfate is dissolved are added thereto, and after performing nitrogen substitution, the solution is heated to be 50° C. while stirring the solution in the flask, and the above monomer mixture is added to the solution over 90 minutes. After the addition ends, emulsion polymerization is continued for 5 hours. In this manner, a dispersion A4 in which acrylic resin particles having a volume average particle diameter of 190 nm and a number average molecular weight (Mn) of 140,000 are dispersed is obtained.

Preparation of Resin Particle Dispersion A 5

| | |
|---|---|
| Styrene | 230 parts |
| n-Butyl acrylate | 80 parts |
| Karenz MOI-BM (manufactured by Showa Denko K.K.) (2-(0-[1'-methylpropylideneamino]carboxyamino)ethyl methacrylate | 81 parts |
| Acrylic acid | 4 parts |

A monomer mixture is prepared by mixing the above.

5 parts of a nonionic surfactant (manufactured by Dai-ichi Kogyo Seiyaku Co., Ltd.: NOIGEN EA-157) and 7 parts of an anionic surfactant (manufactured by Dai-ichi Kogyo Seiyaku Co., Ltd.: NEOGEN SC) are dissolved in 550 parts of ion exchange water in a flask, then, 50 parts of ion exchange water in which 3.7 parts of potassium persulfate is dissolved are added thereto, and after performing nitrogen substitution, the solution is heated to be 50° C. while stirring the solution in the flask, and the above monomer mixture is added to the solution over 90 minutes. After the addition ends, emulsion polymerization is continued for 5 hours. In this manner, a dispersion A5 in which acrylic resin particles having a volume average particle diameter of 160 nm and a number average molecular weight (Mn) of 230,000 are dispersed is obtained.

Moreover, the acrylic resin particles in the obtained dispersion A5 have "a block isocyanate group".

Preparation of Resin Particle Dispersion A6

| | |
|---|---|
| Styrene | 230 parts |
| n-Butyl acrylate | 80 parts |

| | |
|---|---|
| Glycidyl metyhacrylate | 65 parts |
| Acrylic acid | 4 parts |

A monomer mixture is prepared by mixing the above.

5 parts of a nonionic surfactant (manufactured by Dai-ichi Kogyo Seiyaku Co., Ltd.: NOIGEN EA-157), 7 parts of an anionic surfactant (manufactured by Dai-ichi Kogyo Seiyaku Co., Ltd.: NEOGEN SC), and 7 parts of sodium hydrogen carbonate are dissolved in 550 parts of ion exchange water in a flask, then, 50 parts of ion exchange water in which 3.7 parts of potassium persulfate is dissolved are added thereto, and after performing nitrogen substitution, the solution is heated to be 50° C. while stirring the solution in the flask, and the above monomer mixture is added to the solution over 90 minutes. After the addition ends, emulsion polymerization is continued for 5 hours. In this manner, a dispersion A6 in which acrylic resin particles having a volume average particle diameter of 1.70 nm and a number average molecular weight (Mn) of 190,000 are dispersed is obtained.

Preparation of Resin Particle Dispersion B1

| | |
|---|---|
| Styrene | 238 parts |
| n-Butyl acrylate | 80 parts |
| Hydroxyethyl methacrylate | 81 parts |
| Dodecanethiol | 4.9 parts |
| Acrylic acid | 4 parts |

A monomer mixture is prepared by mixing the above.

5 parts of a nonionic surfactant (manufactured by Dai-ichi Kogyo Seiyaku Co., Ltd.: NOIGEN EA-157) and 7 parts of an anionic surfactant (manufactured by Dai-ichi Kogyo Seiyaku Co., Ltd.: NEOGEN SC) are dissolved in 550 parts of ion exchange water in a flask, then, 50 parts of ion exchange water in which 3.7 parts of potassium persulfate is dissolved are added thereto, and after performing nitrogen substitution, the solution is heated to be 50° C. while stirring the solution in the flask, and the above monomer mixture is added to the solution over 90 minutes. After the addition ends, emulsion polymerization is continued for 5 hours. In this manner, a dispersion B1 in which acrylic resin particles having a volume average particle diameter of 160 nm and a number average molecular weight (Mn) of 17,000 are dispersed is obtained.

Preparation of Resin Particle Dispersion B2

| | |
|---|---|
| Styrene | 248 parts |
| n-Butyl acrylate | 90 parts |
| Hydroxyethyl methacrylate | 60 parts |
| Dodecanethiol | 3.3 parts |
| Acrylic acid | 4 parts |

A monomer mixture is prepared by mixing the above.

5 parts of a nonionic surfactant (manufactured by Dai-ichi Kogyo Seiyaku Co., Ltd.: NOIGEN EA-157) and 7 parts of an anionic surfactant (manufactured by Dai-ichi Kogyo Seiyaku Co., Ltd.: NEOGEN SC) are dissolved in 550 parts of ion exchange water in a flask, then, 50 parts of ion exchange water in which 3.7 parts of potassium persulfate is dissolved are added thereto, and after performing nitrogen substitution, the solution is heated to be 50° C. while stirring the solution in the flask, and the above monomer mixture is added to the solution over 90 minutes. After the addition ends, emulsion polymerization is continued for 5 hours. In this manner, a dispersion B2 in which acrylic resin particles having a volume average particle diameter of 150 nm and a number average molecular weight (Mn) of 24,000 are dispersed is obtained.

Preparation of Resin Particle Dispersion B3

| | |
|---|---|
| Styrene | 230 parts |
| n-Butyl acrylate | 80 parts |
| Karenz MOI-BM (manufactured by Showa Denko K.K.) (2-(0-[1'-methylpropylideneamino]carboxyamino)ethyl methacrylate | 81 parts |
| Dodecanethiol | 3.5 parts |
| Acrylic acid | 4 parts |

A monomer mixture is prepared by mixing the above.

5 parts of a nonionic surfactant (manufactured by Dai-ichi Kogyo Seiyaku Co., Ltd.: NOIGEN EA-157) and 7 parts of an anionic surfactant (manufactured by Dai-ichi Kogyo Seiyaku Co., Ltd.: NEOGEN SC) are dissolved in 550 parts of ion exchange water in a flask, then, 50 parts of ion exchange water in which 3.7 parts of potassium persulfate is dissolved are added thereto, and after performing nitrogen substitution, the solution is heated to be 50° C. while stirring the solution in the flask, and the above monomer mixture is added to the solution over 90 minutes. After the addition ends, emulsion polymerization is continued for 5 hours. In this manner, a dispersion B3 in which acrylic resin particles having a volume average particle diameter of 160 nm and a number average molecular weight (Mn) of 19,000 are dispersed is obtained.

Moreover, the acrylic resin particles in the obtained dispersion B3 have "a block isocyanate group".

Preparation of Resin Particle Dispersion B4

Synthesis of Resin B4

| | |
|---|---|
| Bisphersol A ethylene oxide 2 moles adduct | 216 parts |
| Ethylene glycol | 38 parts |
| Terephthalic acid | 200 parts |
| Tetrabutoxy titanate (catalyst) | 0.037 parts |

The above components are put into a two-neck flask dried by heating, then, nitrogen gas is introduced into the container to make an inert atmosphere, and after the temperature is raised while stirring, a co-condensation polymerization reaction is performed at 160° C. for 7 hours, then, the temperature is raised to 220° C. while slowly reducing the pressure to 1333 Pa, and the resultant product is held for 4 hours. After the pressure is returned to normal pressure, 9 parts of trimellitic anhydride is added thereto, then, the pressure is slowly reduced to 1333 Pa again, and the resultant product is held at 220° C. for 1 hour, whereby a resin 84 having a number average molecular weight (Mn) of 6,300 is synthesized.

| | |
|---|---|
| Resin 84 | 115 parts |
| Ionic surfactant (manufactured by Dai-ichi Kogyo Seiyaku Co., Ltd.: NEOGEN RK) | 5 parts |
| Ion exchange water | 180 parts |

The above components are mixed and heated to 100° C., then, the mixture is sufficiently dispersed using an Ultra Turrax T50 manufactured by IKA Japan, K.K., and a dispersion treatment is performed for 1 hour using a pressure discharge type gaulin homogenizer, whereby a dispersion B4 having a volume average particle diameter of 180 nm and an amount of solid content of 40% is prepared.

Preparation of Resin Particle Dispersion B5

| | |
|---|---|
| Styrene | 262 parts |
| n-Butyl acrylate | 112 parts |
| N-(hydroxymethyl)acrylamide | 26 parts |
| Dodecanethiol | 3.5 parts |
| Acrylic acid | 2 parts |

A monomer mixture is prepared by mixing the above.

5 parts of a nonionic surfactant (manufactured by Dai-ichi Kogyo Seiyaku Co., Ltd.: NOIGEN EA-157) and 7 parts of an anionic surfactant (manufactured by Dai-ichi Kogyo Seiyaku Co., Ltd.: NEOGEN SC) are dissolved in 550 parts of ion exchange water in a flask, then, 50 parts of ion exchange water in which 3.7 parts of potassium persulfate is dissolved are added thereto, and after performing nitrogen substitution, the solution is heated to be 50° C. while stirring the solution in the flask, and the above monomer mixture is added to the solution over 90 minutes. After the addition ends, emulsion polymerization is continued for 5 hours. In this manner, a dispersion B5 in which acrylic resin particles having a volume average particle diameter of 160 nm and a number average molecular weight (Mn) of 21,000 are dispersed is obtained.

Preparation of Resin Particle Dispersion B6

| | |
|---|---|
| Styrene | 230 parts |
| n-Butyl acrylate | 80 parts |
| Glycidyl methacrylate | 65 parts |
| Dodecanethiol | 3.5 parts |
| Acrylic acid | 4 parts |

A monomer mixture is prepared by mixing the above.

5 parts of a nonionic surfactant (manufactured by Dai-ichi Kogyo Seiyaku Co., Ltd.: NOIGEN EA-157), 7 parts of an anionic surfactant (manufactured by Dai-ichi Kogyo Seiyaku Co., Ltd.: NEOGEN SC), and 7 parts of sodium hydrogen carbonate are dissolved in 550 parts of ion exchange water in a flask, then, 50 parts of ion exchange water in which 3.7 parts of potassium persulfate is dissolved are added thereto, and after performing nitrogen substitution, the solution is heated to be 50° C. while stirring the solution in the flask, and the above monomer mixture is added to the solution over 90 minutes. After the addition ends, emulsion polymerization is continued for 5 hours. In this manner, a dispersion B6 in which acrylic resin particles having a volume average particle diameter of 150 nm and a number average molecular weight (Mn) of 20,000 are dispersed is obtained.

Preparation of Resin Particle Dispersion B7

| | |
|---|---|
| Styrene | 263 parts |
| n-Butyl acrylate | 113 parts |
| Dodecanethiol | 1.3 parts |
| Methacrylic acid | 24.8 parts |

A monomer mixture is prepared by mixing the above.

5 parts of a nonionic surfactant (manufactured by Dai-ichi Kogyo Seiyaku Co., Ltd.: NOIGEN EA-157) and 7 parts of an anionic surfactant (manufactured by Dai-ichi Kogyo Seiyaku Co., Ltd.: NEOGEN SC) are dissolved in 550 parts of ion exchange water in a flask, then, 50 parts of ion exchange water in which 3.7 parts of potassium persulfate is dissolved are added thereto, and after performing nitrogen substitution, the solution is heated to be 50° C. while stirring the solution in the flask, and the above monomer mixture is added to the solution over 90 minutes. After the addition ends, emulsion polymerization is continued for 5 hours. In this manner, a dispersion B7 in which acrylic resin particles having a volume average particle diameter of 190 nm and a number average molecular weight (Mn) of 32,000 are dispersed is obtained.

Preparation of Resin Particle Dispersion B8

| | |
|---|---|
| Styrene | 248 parts |
| n-Butyl acrylate | 90 parts |
| Hydroxyethyl methacrylate | 60 parts |
| Dodecanethiol | 1.3 parts |
| Acrylic acid | 4 parts |

A monomer mixture is prepared by mixing the above.

5 parts of a nonionic surfactant (manufactured by Dai-ichi Kogyo Seiyaku Co., Ltd.: NOIGEN EA-157) and 7 parts of an anionic surfactant (manufactured by Dai-ichi Kogyo Seiyaku Co., Ltd.: NEOGEN SC) are dissolved in 550 parts of ion exchange water in a flask, then, 50 parts of ion exchange water in which 3.7 parts of potassium persulfate is dissolved are added thereto, and after performing nitrogen substitution, the solution is heated to be 50° C. while stirring the solution in the flask, and the above monomer mixture is added to the solution over 90 minutes. After the addition ends, emulsion polymerization is continued for 5 hours. In this manner, a dispersion B8 in which acrylic resin particles having a volume average particle diameter of 150 nm and a number average molecular weight (Mn) of 42,000 are dispersed is obtained.

Preparation of Curing Agent Dispersion

| | |
|---|---|
| Vestagon B-1530 (manufactured by Evonik Industries) (polyblock isocyanate) | 50 parts |
| Sodium dodecyl benzene sulfonate | 5 parts |
| Ion exchange water | 200 parts |

The above materials are mixed, and the mixture is subjected to a dispersion treatment for 0.3 hours using a high-pressure impact type disperser ultimizer (HJP 30006, manufactured by Sugino Machine Limited), whereby a curing agent dispersion having an amount of solid content of 20% is obtained.

Example 1

Preparation of Powder Particles 1

Resin particle dispersion A1 amount to become the resin amount described in Table 1

Resin particle dispersion B1 amount to become ⅔ of the resin amount described in Table 1

Heat curing agent dispersion amount to become the amount of heat curing agent described in Table 1

Colorant dispersion amount to become the colorant amount described in Table 1

| Poly aluminum chloride | 1.2 parts |
|---|---|
| Ion exchange water | 380 parts |

According to the above mixing proportion, the above dispersions and components are sufficiently mixed and dispersed in a stainless round flask using a homogenizer (Ultra Turrax T50, manufactured by IKA Japan, K.K.), then, the resultant product is heated to 43° C. while being stirred in a heating oil bath, and held at 43° C. for 60 minutes.

Thereafter, the resin particle dispersion B1 is additionally added in an amount to become ⅓ of the resin amount described in Table 1 (that is, ⅔ of the used amount of the resin particles in the resin particle dispersion B1 is added initially, and the remaining ⅓ is additionally added), then, the resultant product is slowly stirred.

After adjusting pH in the system to 6.0 with a 0.5 mol/L sodium hydroxide aqueous solution, the resultant product is heated to 93° C. while being continuously stirred.

During being heated to 93° C., the sodium hydroxide aqueous solution is additionally added dropwise thereto so as to adjust the pH to be equal to or less than 5.0. Then, the resultant product is held at 93° C. for 3 hours.

After the reaction ends, the resultant product is cooled, filtered, and sufficiently washed with ion-exchange water, and solid-liquid separation is performed by a Nutsche type suction filtration. Furthermore, the resultant product is redispersed in 3-liter of ion exchange water at 40° C., and stirring at 300 rpm for 15 minutes and washing are performed. This washing operation is repeated five times, then, solid-liquid separation is performed by a Nutsche type suction filtration, and vacuum drying is performed for 12 hours, whereby particles are obtained.

When measuring particle diameters of the particles using a Coulter counter, the volume average particle diameter D50v is 6.9 μm, and the volume average particle size distribution index SDv is 1.40.

In addition, when measuring the content of an aluminum ion using a fluorescent X-ray by the above method, the content is 0.08% by weight.

Moreover, the particles are particles (powder particles 1) having a core-shell structure equipped with a resin coating layer formed by using the resin particle dispersion B1.

Manufacture of Powder Coating Material 1

0.2 parts by weight of hydrophobic silica (manufactured by Cabot Corporation, TS720) is added to 50 parts by weight of the powder particles 1, and the resultant product is mixed with a Sample Mill, whereby a powder coating material 1 is obtained.

Examples 2 to 7, 14 and Comparative Examples 1 to 3

The types and the amounts of the resin particle dispersions A1 and B1, and the amount of the heat curing agent dispersion in Preparation of powder particles 1 in Example 1 are changed according to the following Table 1, whereby powder particles 2 to 7 and 14, and comparative powder particles C1 to C3 which are particles having a core-shell structure are obtained.

Moreover, the amount described in the following Table 1 represents the amount of solid content in various dispersions.

In addition, the resin coating layer of each powder particle is a resin coating layer formed by using an amount of ⅓ of the resin amount described in Table 1 of the resin particle dispersions B1 to B4.

Powder coating materials 2 to 7 and 14, and comparative powder coating materials C1 to C3 are obtained in the same manner as in manufacture of powder coating material 1 in Example 1 except that the obtained powder particles 2 to 7 and 14, and the comparative powder particles C1 to C3 are used.

Example 8

Resin particle dispersion A1 amount to become the resin amount described in Table 1

Resin particle dispersion B1 amount to become the resin amount described in Table 1

Heat curing agent dispersion amount to become the amount of heat curing agent described in Table 1

Colorant dispersion amount to become the colorant amount described in Table 1

| Poly aluminum chloride | 0.15 parts |
|---|---|
| Ion exchange water | 380 parts |

According to the above mixing proportion, the above dispersions and components are sufficiently mixed and dispersed in a stainless round flask using a homogenizer (Ultra Turrax T50, manufactured by IKA Japan, K.K.), then, the resultant product is heated to 43° C. while being stirred in a heating oil bath, and held at 43° C. for 60 minutes.

Then, pH in the system is adjusted to 6.0 with a 0.5 mol/L sodium hydroxide aqueous solution, and the resultant product is heated to 93° C. while being continuously stirred. During being heated to 93° C., the sodium hydroxide aqueous solution is additionally added dropwise thereto so as to adjust the pH to be equal to or less than 5.0. Then, the resultant product is held at 93° C. for 3 hours.

After the reaction ends, the resultant product is cooled, filtered, and sufficiently washed with ion-exchange water, and solid-liquid separation is performed by a Nutsche type suction filtration. Furthermore, the resultant product is redispersed in 3-liter of ion exchange water at 40° C., and stirring at 300 rpm for 15 minutes and washing are performed. This washing operation is repeated five times, then, solid-liquid separation is performed by a Nutsche type suction filtration, and vacuum drying is performed for 12 hours, whereby particles are obtained.

When measuring particle diameters of the particles using a Coulter counter, the volume average particle diameter D50v is 6.8 μm, and the volume average particle size distribution index SDv is 1.40.

In addition, when measuring the content of an aluminum ion using a fluorescent X-ray by the above method, the content is 0.08% by weight.

Moreover, the particles are particles (powder particles 8) having a single layer structure.

Powder coating material 8 is obtained in the same manner as in manufacture of powder coating material 1 in Example 1 except that the obtained powder particles 8 are used.

Examples 9 to 13

The types and the amounts of the resin particle dispersions A1 and B1, and the amount of the heat curing agent dispersion in the preparation of the powder particles 8 in Example 8 are changed according to the following Table 1, whereby powder particles 9 to 13 having a single layer structure are obtained.

Moreover, the amount described in the following Table 1 represents the amount of solid content in various dispersions.

Powder coating materials 9 to 13 are obtained in the same manner as in manufacture of powder coating material 1 in Example 1 except that the obtained powder particles 9 to 13 are used.

Comparative Example 4

Particles (powder particles C4) having a core-shell structure are obtained in the same conditions as in Example 1 except that poly aluminum chloride is reduced to 0.1 part by weight, and 40 parts of a 10% NTA (nitrilotriacetic acid) metal salt aqueous solution (Chelest 70, manufactured by Chelest Corporation) is used together with sodium hydroxide aqueous solution when pH in the system is adjusted to 6.0 with a 0.5 mol/L sodium hydroxide aqueous solution in Preparation of powder particles 1 in Example 1.

When measuring particle diameters of the particles using a Coulter counter, the volume average particle diameter D50v is 9.0 μm, and the volume average particle size distribution index SDv is 1.53.

In addition, when measuring the content of an aluminum ion using a fluorescent X-ray by the above method, the content is 0.09% by weight.

Powder coating material C4 is obtained in the same manner as in manufacture of powder coating material 1 in Example 1 except that the obtained powder particles C4 are used.

Evaluation

Manufacture of Coating Film Sample of Powder Coating Material

A steel sheet of 200 mm×100 mm×0.8 mm treated with zinc phosphate is subjected to electrostatic spray coating with the powder coating material manufactured by the above method such that the film thickness after baking becomes 40 μm using a corona charging type coating gun (manufactured by Asahi Sunac Corporation, XR4-110C), then, the resultant product is baked at 180° C. for 30 minutes, and held at room temperature, whereby a coating film sample is obtained.

Evaluation of Smoothness of Coating Film

The center line average roughness (hereinafter, referred to as "Ra". unit: μm) of the surface of the coating film sample is measured by using a surface roughness measuring instrument (SURFCOM 1400A, manufactured by Tokyo Seimitsu Co., Ltd.).

Moreover, it shows that as a number of Ra increases, surface smoothness decreases, and equal to or less than 0.5 μm is evaluated as a favorable level.

Evaluation of Impact Resistance of Coating Film

The test of impact resistance is performed on the surface of the coating film sample based on JIS K 5600 5-3.

Numerical values of the evaluation results show "height at which a weight is dropped" when cracking or peeling occurs in the coating film.

It shows that as the height is increased, the impact resistance is increased, and in the exemplary embodiment, equal to or greater than 55 cm is evaluated as a favorable level.

Details of each example, and the evaluation results are shown in Table 1.

TABLE 1

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| Powder coating material No. | | | 1 | 2 | 3 | 4 | 5 | 6 | 7 | 8 | 9 | 10 |
| Composition (amount: g) | Dispersion type | A1 | 10 | | | | | 10 | 10 | 10 | | |
| | | A2 | | 9 | 18 | 28 | 33 | | | | | |
| | | A3 | | | | | | | | | 18 | |
| | | A4 | | | | | | | | | | |
| | | A5 | | | | | | | | | | 18 |
| | | A6 | | | | | | | | | | |
| | | B1 | 90 | 34 | 25 | 15 | 10 | | | 90 | 25 | 38 |
| | | B2 | | | | | | 90 | | | | |
| | | B3 | | 57 | 57 | 57 | 57 | | | | 57 | 44 |
| | | B4 | | | | | | | 90 | | | |
| | | B5 | | | | | | | | | | |
| | | B6 | | | | | | | | | | |
| | | B7 | | | | | | | | | | |
| | | B8 | | | | | | | | | | |
| Heat curing agent | | | 25 | | | | | 19 | 28 | 25 | | |
| Colorant | | | 1 | 1 | 1 | 1 | 1 | 1 | 1 | 1 | 1 | 1 |
| Resin A/entirety of resins (% by weight) | | | 10 | 9 | 18 | 28 | 33 | 10 | 10 | 10 | 18 | 18 |
| Metal ion (% by weight) | | | 0.08 | 0.09 | 0.10 | 0.10 | 0.11 | 0.12 | 0.05 | 0.08 | 0.10 | 0.08 |
| Form of powder particle | | | Core-shell | Core-shell | Core-shell | Core-shell | Core-shell | Core-shell | Core-shell | Single-layer | Single-layer | Single-layer |
| D60v (um) | | | 6.9 | 6.5 | 7.1 | 6.8 | 6.1 | 7.2 | 6.8 | 6.8 | 7.0 | 7.1 |
| GSDv | | | 1.40 | 1.43 | 1.41 | 1.38 | 1.31 | 1.41 | 1.39 | 1.40 | 1.41 | 1.38 |
| Surface roughness Ra (um) | | | 0.3 | 0.3 | 0.3 | 0.3 | 0.4 | 0.3 | 0.3 | 0.3 | 0.3 | 0.3 |
| Impact resistance (cm) | | | 60 | 60 | 65 | 65 | 60 | 60 | 60 | 60 | 65 | 60 |

| | | | Example | | | | Comparative Example | | | |
|---|---|---|---|---|---|---|---|---|---|---|
| | | | 11 | 12 | 13 | 14 | 1 | 2 | 3 | 4 |
| Powder coating material No. | | | 11 | 12 | 13 | 14 | C1 | C2 | C3 | C4 |
| Composition (amount: g) | Dispersion type | A1 | | | | 10 | | | | |
| | | A2 | | | | | | 3 | 50 | 10 |
| | | A3 | | | | | | | | |
| | | A4 | | 23 | 20 | | | | | |
| | | A5 | | | | | | | | |

TABLE 1-continued

|  | | | | | | | | |
|---|---|---|---|---|---|---|---|---|
| A6 | 17 | | | | | | | |
| B1 | | | | | 100 | 97 | 50 | 90 |
| B2 | | | | | | | | |
| B3 | | | | | | | | |
| B4 | | | | | | | | |
| B5 | | | 58 | | | | | |
| B6 | 28 | 44 | | | | | | |
| B7 | 55 | 33 | 22 | | | | | |
| B8 | | | | 90 | | | | |
| Heat curing agent | | | | 19 | 25 | 25 | 25 | 25 |
| Colorant | 1 | 1 | 1 | 1 | 1 | 1 | 1 | 1 |
| Resin A/entirety of resins (% by weight) | 17 | 23 | 20 | 10 | 0 | 3 | 50 | 10 |
| Metal ion (% by weight) | 0.10 | 0.08 | 0.09 | 0.11 | 0.10 | 0.08 | 0.10 | 0.09 |
| Form of powder particle | Single-layer | Single-layer | Single-layer | Core-shell | Core-shell | Core-shell | Core-shell | Core-shell |
| D60v (um) | 6.8 | 7.2 | 7.1 | 7.1 | 6.6 | 6.9 | 7.3 | 9.0 |
| GSDv | 1.40 | 1.41 | 1.40 | 1.41 | 1.38 | 1.40 | 1.43 | 1.53 |
| Surface roughness Ra (um) | 0.3 | 0.3 | 0.3 | 0.5 | 0.3 | 0.3 | 0.7 | 0.7 |
| Impact resistance (cm) | 60 | 60 | 60 | 55 | 45 | 50 | 45 | 50 |

From the above results, it is found that in the exemplary embodiment, even in a case where the volume average particle diameter D50v of the powder particles is a small diameter equal to or less than 7.2 μm, the smoothness and the impact resistance of the obtained coating film also are excellent compared to Comparative Examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A thermosetting powder coating material comprising: powder particles that contain a thermosetting resin A having a number average molecular weight equal to or greater than 100,000 from 5% by weight to 40% by weight with respect to the entirety of resins, and have a volume particle size distribution index GSDv equal to or less than 1.50.

2. The thermosetting powder coating material according to claim 1, wherein the thermosetting resin A in the powder particles has particles with an average particle diameter from 0.02 μm to 0.4 μm.

3. The thermosetting powder coating material according to claim 1, wherein the thermosetting resin A has at least one thermosetting functional group selected from the group consisting of a hydroxyl group, a carboxy group, a block isocyanate group, and an epoxy group.

4. The thermosetting powder coating material according to claim 1, wherein a content of the thermosetting resin A is from 5% by weight to 30% by weight with respect to the weight of the entirety of resins included in the powder particles.

5. The thermosetting powder coating material according to claim 1, wherein the thermosetting resin A is selected from the group consisting of a thermosetting (meth)acrylic resin and a thermosetting polyester resin.

6. The thermosetting powder coating material according to claim 1, wherein the powder particles contains divalent or higher metal ions in a content from 0.002% by weight to 0.2% by weight.

7. The thermosetting powder coating material according to claim 1, wherein the powder particles contains a thermosetting resin B having a number average molecular weight from 1,000 to 50,000, and at least one thermosetting functional group selected from the group consisting of a hydroxyl group, a carboxy group, a block isocyanate group, and an epoxy group.

8. The thermosetting powder coating material according to claim 1, wherein the thermosetting resin A and the thermosetting resin B are selected from the group consisting of a thermosetting (meth)acrylic resin and a thermosetting polyester resin.

9. The thermosetting powder coating material according to claim 1, wherein a volume average particle diameter D50v of the powder particles is from 1 μm to 25 μm.

10. The thermosetting powder coating material according to claim 1, wherein an average circularity of the powder particles is equal to or greater than 0.96.

11. The thermosetting powder coating material according to claim 1, wherein the powder particles are particles having a core-shell structure.

12. The thermosetting powder coating material according to claim 11, wherein a coverage ratio of a resin coating portion of the powder particles is from 30% to 100%.

13. The thermosetting powder coating material according to claim 11, wherein a thickness of the resin coating portion is from 0.2 μm to 4μm.

14. The thermosetting powder coating material according to claim 11, wherein the powder particles include a metal ion capable of taking a charge from divalent to tetravalent.

15. The thermosetting powder coating material according to claim 14, wherein a content of the metal ion is from 0.002% by weight to 0.2% by weight with respect to the entire powder particles.

16. The thermosetting powder coating material according to claim 1, wherein the thermosetting resin A and the thermosetting resin B are thermosetting polyester resins, and a total of an acid value and a hydroxyl group value thereof is from 10 mg KOH/g to 250 mg KOH/g.

17. The thermosetting powder coating material according to claim 1, wherein the powder particles include an external additive, and an amount of the external additive externally added is from 0.01% by weight to 5% by weight with respect to the powder particles.

18. The thermosetting powder coating material according to claim 17, wherein the external additive includes at least silica or titania.

19. A coated product, comprising:
a coating film formed of the thermosetting powder coating material according to claim 1 on the surface of an object to be coated.

* * * * *